Aug. 1, 1961     A. I. CHAPMAN, JR     2,994,479
ELECTRO-MECHANICAL INTEGRATION
Filed Dec. 26, 1957
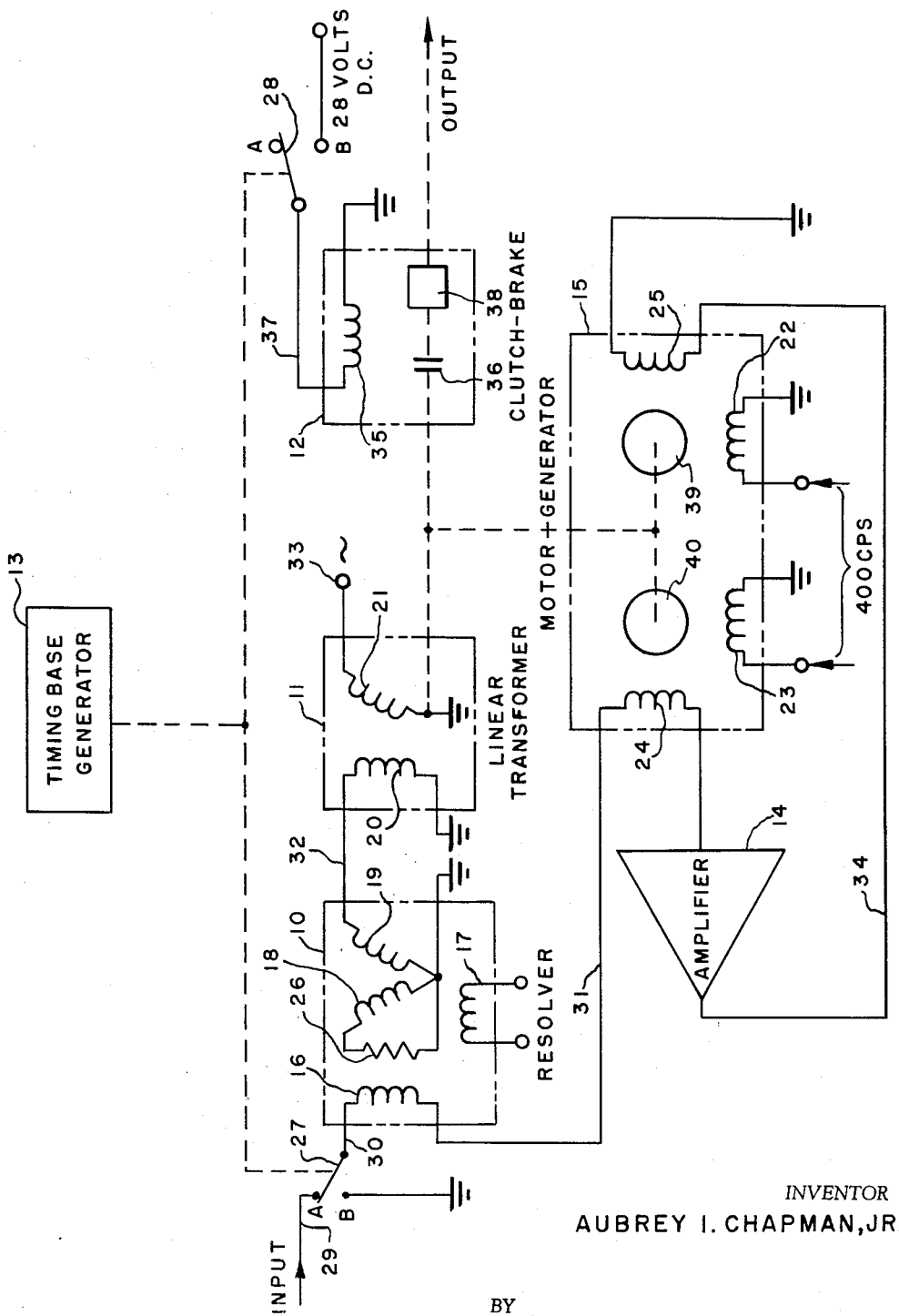
INVENTOR
AUBREY I. CHAPMAN, JR.
BY
*Stevens, Davis, Miller & Mosher*
ATTORNEYS

United States Patent Office

2,994,479
Patented Aug. 1, 1961

2,994,479
ELECTRO-MECHANICAL INTEGRATION
Aubrey I. Chapman, Jr., Dallas, Tex., assignor to Texas Instruments Incorporated, Dallas, Tex., a corporation of Delaware
Filed Dec. 26, 1957, Ser. No. 705,381
3 Claims. (Cl. 235—183)

This invention relates to a system for integrating slowly changing functions. The integration is carried out by accepting an alternating current electrical signal having an amplitude $E_s$ and delivering an output rotation $\theta$ proportional to the integral of the input signal $$(\theta = k \int E_s dt)$$

Such electro-mechanical integration is used in navigational computers to integrate the ground speed of an aircraft or other means of locomotion and thereby provide the computer with an indication of the distance travelled.

Electro-mechanical integration systems of the prior art perform the integration function by means of a motor which drives a shaft at a speed proportional to the amplitude of the signal being integrated. The angular displacement of this shaft is the time integral of the shaft's velocity so the angular displacement is proportional to the integral of the input signal. This method of integrating is very inaccurate because no motor will produce a shaft velocity which is accurately proportional to the amplitude of signal and only very expensive special motors have sufficient accuracy to give any useful results at all.

According to the system of the present invention, a servo-mechanism rotates a first shaft through an angle proportional to the amplitude of input signal to be integrated. The first shaft is engaged with the output shaft during this operation. The first shaft is then disengaged from the output shaft and brought back to zero angular displacement while the output shaft is maintained in its position. After a short time interval the first shaft again is engaged with the output shaft and again the first shaft is rotated through an angle proportional to the amplitude of the input signal. The operation is continuously repeated in this manner and each time the output shaft will be provided with additional angular displacement. The total angular displacement of the output shaft will be proportional to the time integral of the amplitude of the input signal. This system is lightweight, inexpensive and reasonably accurate.

The objects and advantages of the present invention can be better understood from the following description when taken with reference to the single figure of the drawing showing schematically the system.

As shown in the figure the system of the present invention comprises: a resolver 10, a linear transformer 11, a clutch-brake 12, a time base generator 13, an amplifier 14 and a motor-generator 15.

The resolver 10, shown only schematically in FIG. 1, is of the type having two stator windings 16 and 17 which are positioned at right angles from each other and two rotor windings 18 and 19, which are also positioned at right angles from each other. Resolvers of this general type are shown and described in detail on pages 46–51 in a book entitled Servomechanism Practice by W. R. Ahrendt, published by McGraw-Hill Book Co., Inc., New York, 1954. The stator winding 17 is unconnected and the rotor winding 18 is shunted by a resistor 26. When A.C. signals are applied to windings 16 and 19 of the resolver from lines 30 and 32 the resolver will combine the applied signals out of phase to produce on line 31 an A.C. signal the amplitude of which is proportional to the difference in amplitude between the two signals. The rotor 18 of the resolver may be rotated to provide fine amplitude calibration of the signal applied from line 32 so that the signals are combined in the proper amplitude ratio.

The linear transformer or induction potentiometer 11, also shown only schematically, has a stator winding 20, and a rotor winding 21. Linear transformers of this type are described in detail under the caption induction potentiometers on page 51 of the book referred to in the preceding paragraph. A constant amplitude 400 cycle A.C. signal is applied to the rotor winding 21 from terminal 33. The stator winding 20 will apply a resulting induced 400 cycle signal to line 32. The amplitude of this signal varies linearly from zero with the angle of rotation of the rotor winding 21 through its useful range. The signal induced in winding 20 is applied to winding 19 over line 32. The motor-generator 15, shown schematically, has two motor stator windings, fixed phase winding 22 and control phase winding 25, and two generator stator windings, excitation winding 23 and output winding 24. Motor rotor 39 and generator rotor or damping drag cup 40 are on the same shaft. A 400 cycle A.C. power source excites the fixed phase motor winding 22 and the damping generator excitation winding 23. When a 400 cycle signal 90° out of phase with the 400 cycle A.C. voltage on the fixed phase is applied to the control phase winding 25, the resultant magnetic field causes the rotor 39 to rotate. A signal of 90° leading phase shift will cause rotation in one direction and a signal of 90° lagging phase shift will cause rotation in the opposite direction. The damping generator drag cup 40 rotated in the alternating magnetic field set up by the excitation winding 23 sets up a field of its own which is in turn coupled to the output winding 24. The output voltage is proportional to the speed of the motor and is connected in the circuit out of phase with the input signal to the amplifier on lead 31 so as to produce damping of the servo loop response. Motor-generators of this general type are described in detail on pages 115 to 126 in the book referred to above.

The clutch-brake 12 is of the magnetic type and comprises an exciting winding 35, a clutch mechanism 36, and a brake unit 38. When the winding 35 is deenergized, the clutch mechanism 36 is engaged and when the winding 35 becomes energized, it disengages the clutch mechanism 36. At the same time, brake unit 38 which is disengaged from the output side of clutch mechanism when winding 35 is deenergized, engages with the output side of clutch mechanism 36 when winding 35 is energized to hold it stationary and prevent the output side of clutch mechanism 36 from creeping, overriding or oscillating and thereby introduce errors into the output of the system. Magnetic clutches of the type used in the system are described on page 392 in Electronic Instruments, vol. 21, M.I.T. Radiation Laboratory Series, McGraw Hill Book Co., Inc., New York. The rotor of the motor 15 drives the rotor winding 21 of the linear transformer 11 and the input side of the clutch mechanism 36 of the clutch-brake 12. The output side of the mechanism is connected to the output shaft of the system.

The time base generator 13 controls two switches 27 and 28 by means of the mechanical connection shown to operate the switches back and forth between the positions indicated as A and B simultaneously and at a constant rate. When the switch 27 is at its operative position A, the switch 28 will likewise be at its position A. When the switch 27 is changed to position B, the switch 28 will likewise be moved to position B. The time base generator may, for example, be an intervalometer connected to the windings of two relays or it may be a cam mechanism. When the switch 27 is in position A, a 400 cycle input signal $E_s$ is connected over the switch 27 to the stator winding 16 from input lead 29. When the switch 28 is in position A, the winding 35 of the clutch-brake 12 is unconnected and the clutch mechanism 36 will be engaged and the brake unit 38 disengaged. When the switches 27 and 28 are operated to position B, a D.C. voltage supply of 28 volts will energize the winding 35 over line 37 and the clutch mechanism 36 will be disengaged and brake unit 38 will engage to hold the output side of the clutch mechanism stationary. In position B the switch 27 connects ground to the winding 16. The ground serves as a reference signal of zero amplitude.

At the beginning of operation the switches 27 and 28 are in position A, as shown in the figure. The linear transformer 11 is positioned at electrical zero where no signal is induced in the stator winding 20. The signal input $E_s$ is applied over the switch 27 to the stator winding 16. Since the rotor winding 21 of the linear transformer is at electrical zero, no signal will be applied to winding 19 and the signal output on line 31 is equal to the input signal $E_s$. The signal on line 31 appears at once through the winding 24 of the motor-generator as the error signal input to the amplifier 14. The resulting amplified output from amplifier 14 is applied to the winding 25 and starts the motor turning. Since the switch 28 is in position A, the winding 35 of the clutch-brake 12 is not energized and the clutch mechanism 36 is engaged and brake unit 38 disengaged, thus, as the rotor of the motor-generator 15 turns it will drive the output shaft and the rotor winding 21 of the linear transformer 11. As the rotor winding 21 beings to turn, a signal will be induced in the stator winding 20 and applied to the rotor winding 19 of the resolver 10. The signal applied from the amplifier 14 to the winding 25 of the motor-generator causes the motor-generator to turn in such a direction as to drive the stator winding 21 in such a direction that the signal induced in the winding 20 and thus applied to the winding 19 will be combined 180° out of phase with the input signal applied to the winding 16 and thus will subtract from it. The motor-generator 15 will continue to drive the linear transformer rotor winding 21 and the output shaft until the signal induced in the stator winding 20 and applied to the rotor winding 19 is sufficiently large to cancel out the input signal whereupon there will be no signal output on line 31 applied to the amplifier 14 and no signal applied to the motor-generator 15 and the rotation of the rotor winding 21 and the output shaft will cease. At this time the motor holds its position and the output shaft and the stator winding 21 have been rotated through an angle proportional to the amplitude of the input signal $E_s$ at terminal 29. This operation takes a very short time and thereafter the time base generator 13 operates the switches 27 and 28 to positions B. At this point 28 volts D.C. will be applied to the winding 35 of the clutch-brake 36 causing the clutch-mechanism 36 to disengage and brake unit 38 to engage and a ground reference signal is applied over the switch 27 to the winding 16. Hence, the signal induced in winding 16 by the signal applied to the winding 19 will be the only signal output on line 31 applied to the input of the amplifier 14. This signal is 180° out of phase with the original input signal. Thus, the output from the amplifier 14 applied to the control phase winding 25 of the motor generator will start the motor to turn back in the opposite direction. Since the clutch is disengaged the motor will only drive the rotor winding 21 of the linear transformer 11. As the motor drives the winding 21 the signal induced in the stator winding 20 will decrease and the motor will continue driving the rotor winding 21 until it reaches the position of electrical zero. There will then be no signal applied to the resolver 10 and no signal applied from line 31 to the amplifier 14. Thus, the motor will stop with the winding 21 of the linear transformer 11 at the position of electrical zero. Again this operation only takes a short time and thereafter the time base generator 13 will again operate the contacts 27 and 28 to position A and the same sequence of operation will occur as above described but this time the output shaft will be driven through a further angle proportional to the input signal $E_s$ at this second time. Thus, the amplitude of the input signal $E_s$ will be periodically and repeatedly sampled at precise intervals and at these samplings the output shaft will be rotated through a distance proportional to the amplitude of the input signal $E_s$. Thus, the total rotation $\theta$ of the output shaft will be approximately proportional to the time integral of the amplitude of the input signal $E_s$. The shorter the time between samplings the more accurately the output will indicate the integral of the input signal.

As is stated above, the input signal is a 400 cycle A.C. signal. The preferred system is designed to work on 400 cycles because it is designed for use in aircraft. It is obvious that other frequencies could be use instead. Also, any signal variation including that of a D.C. signal can be easily converted into the variation in amplitude of a 400 cycle signal by conventional methods.

The resolver 10, the linear transformer 11, the amplifier 14 and the motor-generator 15 serve as a servomechanism to drive the input of the clutch mechanism 36 through an angle proportional to the amplitude of the signal applied to the input. Other means besides the preferred means disclosed could be used to accomplish the same result.

The resolver itself serves merely to combine the input voltage from the input and the feedback voltage from the linear transformer out of phase with each other so that an output is produced on line 31 proportional to the difference of the input signals applied from lines 30 and 32. If a fine loop calibration adjustment is not needed or desired the resolver could be replaced by a simple summation network or any apparatus accomplishing the same function. Likewise, the linear transformer itself could be replaced by a multi-turn precision potentiometer or any means which produces an output signal having an amplitude proportional to an angle of input rotation. The remaining equipment could similarly be substituted for by equivalent means. If, in the computer system, the amplifier is needed elsewhere it can be time shared by removing it from the circuit between samplings. These and other modifications can be made without departing from the spirit and scope of the invention which is to be limited only as defined in the appended claims.

What is claimed is:

1. An integrating device comprising; an output shaft, an input lead, a second shaft, motor means to rotate said second shaft in response to an applied signal, said second means rotating said second shaft in one direction in response to a signal of one phase and rotating said motor means in the opposite direction in response to a signal 180° reversed in phase, conversion means to produce an output signal having an amplitude proportional to the angle of rotation of said second shaft, summation means to combine the signal applied to a first input thereof 180° out of phase with the signal applied to a second input thereof, circuit means for applying the output signal from conversion means to the second input of said summation means, circuit means to apply the output signal of said summation means to said motor means, switch means having a first position and a second position, said switch means applying said input lead to the first input of said summation means when in said first position and applying a reference signal to the first input of said summation means when in said second position, timing means, means to continuously switch said switch means back and forth between said first and second positions responsive to said timing means and means to engage and disengage said second shaft with said output shaft responsive to said timing means, said second shaft being engaged with said output shaft when said switch means is in said first position and being disengaged when said switch means is in said second position.

2. An integrating device comprising; an output shaft, an input lead, a second shaft, motor means to rotate said second shaft in response to an applied signal, said motor means rotating said second shaft in one direction in response to a signal of one phase and rotating said motor means in the opposite direction in response to a signal 180° reversed in phase, conversion means to produce an output signal having an amplitude proportional to the angle of rotation of said second shaft, summation means to combine the signal applied to a first input thereof 180° out of phase with the signal applied to a second input thereof, circuit means for applying the output signal from said conversion means to the second input of said summation means, circuit means to apply the output signal of said summation means to said motor means, switch means having a first position and a second position, said switch means applying said input lead to the first input of said summation means when in said first position and applying a reference signal to the first input of said summation means when in said second position, clutch means to engage said second shaft with said output shaft, timing means to continuously switch said switch means back and forth between said first and second positions and to engage and disengage said clutch means, said clutch means being engaged when said switch means is in said first position and being disengaged when said switch means is in said second position.

3. An electro-mechanical integrating device comprising: an output shaft, a second shaft, an electrical input lead, a source of reference electrical signal, switch means, said switch means interconnecting with said first input lead when in a first position and interconnecting with said reference electrical signal when in a second position, means interconnected to said switch means to rotate said second shaft in one direction through an angle proportional to the electrical signal on said input lead when said switch means is in said first position and to rotate said second shaft in the opposite direction through the same angle in response to said reference electrical signal when said switch means is in said second position; a time base timing means, means to continuously switch said switch means back and forth between first and second positions responsive to said time base timing means, electro-mechanical means to engage and disengage said second shaft to said output shaft responsive to said time base timing means, said second shaft being engaged when said switch means is in said first position and being disengaged when said switch means is in said second poition.

References Cited in the file of this patent

UNITED STATES PATENTS

| | | |
|---|---|---|
| 2,432,141 | Dehmel | Dec. 9, 1947 |
| 2,622,231 | Gray | Dec. 16, 1952 |
| 2,671,610 | Sweer | Mar. 9, 1954 |
| 2,701,327 | Ringoen | Feb. 1, 1955 |
| 2,733,391 | Mayer | Jan. 31, 1956 |
| 2,919,065 | Goldman | Dec. 29, 1959 |
| 2,928,602 | Quinn | Mar. 15, 1960 |
| 2,932,449 | Pisarchik | Apr. 12, 1960 |

FOREIGN PATENTS

| | | |
|---|---|---|
| 18,709 | Great Britain | Aug. 15, 1914 |